(12) United States Patent
Uematsu et al.

(10) Patent No.: US 8,623,939 B2
(45) Date of Patent: Jan. 7, 2014

(54) INK

(75) Inventors: Daisuke Uematsu, Aichi-gun (JP); Kentaro Mori, Inuyama (JP); Nobuhiro Hayakawa, Chita (JP)

(73) Assignee: NGK Spark Plug Co., Ltd., Aichi (JP)

( * ) Notice: Subject to any disclaimer, the term of this patent is extended or adjusted under 35 U.S.C. 154(b) by 52 days.

(21) Appl. No.: 13/363,845

(22) Filed: Feb. 1, 2012

(65) Prior Publication Data

US 2012/0196096 A1 Aug. 2, 2012

(30) Foreign Application Priority Data

Feb. 2, 2011 (JP) ................................. 2011-020629

(51) Int. Cl.
*C09D 11/02* (2006.01)

(52) U.S. Cl.
USPC ...................... 523/201; 428/195.1; 106/31.92

(58) Field of Classification Search
USPC ........................................................ 523/160
See application file for complete search history.

(56) References Cited

U.S. PATENT DOCUMENTS

| | | | |
|---|---|---|---|
| 5,009,708 A | 4/1991 | Grunwald et al. | |
| 8,043,535 B2 | 10/2011 | Kamikoriyama et al. | |
| 2004/0180993 A1* | 9/2004 | Shelton et al. | 524/38 |
| 2010/0096596 A1* | 4/2010 | Lewis et al. | 252/500 |
| 2012/0126183 A1 | 5/2012 | Hosoi et al. | |
| 2012/0154494 A1 | 6/2012 | Uematsu et al. | |

FOREIGN PATENT DOCUMENTS

| | | | |
|---|---|---|---|
| JP | 53-118795 A | 10/1978 | |
| JP | 58-89669 A | 5/1983 | |
| JP | 8-148369 A | 6/1996 | |
| JP | 2000-327964 A | 11/2000 | |
| JP | 2004-250587 A | 9/2004 | |
| JP | 2006-104511 A | 4/2006 | |
| JP | 2006-173042 A | 6/2006 | |
| JP | 2006-193796 A | 7/2006 | |
| JP | 2006-210301 A | 8/2006 | |
| JP | 2006-299385 A | 11/2006 | |
| JP | 2006-335995 A | 12/2006 | |
| JP | 2008-069355 A | 3/2008 | |
| JP | 2009-170447 A | 7/2009 | |
| JP | 2012-22799 A | 2/2012 | |
| JP | 2012-142263 A | 7/2012 | |
| JP | 51-40187 B | 2/2013 | |

OTHER PUBLICATIONS

Japanese Office Action dated Jul. 30, 2013 for corresponding Japanese Patent Application No. 2012-004055.

* cited by examiner

*Primary Examiner* — Doris Lee
(74) *Attorney, Agent, or Firm* — Sughrue Mion, PLLC

(57) ABSTRACT

An ink contains at least a first solid particle, and a second solid particle formed of a base material of a different main component from that of the first solid particle. The first solid particle and the second solid particle have zeta potentials of the same polarity, or zeta potentials of 0±5 mV. The first and second solid particles in the ink have the same surface property, specifically the same interface property in the ink. This makes it possible to use a common dispersant suited for adsorption on the first and second solid particles. In this way, more than one kind of solid particle can be stably dispersed using a sole kind of dispersant.

13 Claims, 8 Drawing Sheets

INK

TECHNICAL FIELD

The present invention relates to ink that contain more than one kind of solid particle, and to devices using such ink.

BACKGROUND ART

A conductive ink is proposed that includes a metal powder such as a nickel powder and a platinum powder, and a metal oxide powder dispersed in a solvent, and that can thus be used to form wiring and electrodes by using techniques such as inkjet printing (see Patent Document 1). This type of conductive ink requires the metal powder and the metal oxide powder to be stably dispersed in the solvent to ensure desired conductivity for the conductor formed by printing.

In ink containing two or more kinds of solid particles such as metal particles and metal oxide particles, the particle surface properties are generally different for each different solid particle, and accordingly the type of dispersant appropriate for adsorption on the particle surface also differs for each type of solid particle. This makes it difficult to disperse two or more kinds of solid particles in the ink using a sole kind of dispersant.

RELATED ART DOCUMENTS

Patent Documents

[Patent Document 1] JP-A-2006-210301

SUMMARY OF THE INVENTION

Problems to be Solved by the Invention

It is therefore common practice to add more than one kind of dispersant corresponding to each type of solid particle, so that more than one kind of solid particle having different particle surface properties can be stably dispersed in ink. However, considering productivity such as the manufacturing cost of the ink itself, the ink composition should desirably be made as simple as possible.

The present invention has been completed to solve the foregoing problems, and it is an object of the present invention to provide an ink that can stably disperse more than one kind of solid particle without complicating the composition more than necessary. The invention is also intended to provide a device using such an ink.

Means for Solving the Problems

In order to achieve the foregoing object, an ink according to an embodiment of the present invention includes at least:

a first solid particle; and a second solid particle formed of a base material of a different main component from that of the first solid particle, at least one of the first solid particle and the second solid particle being surface-modified, and the first solid particle and the second solid particle having zeta potentials of the same polarity, or zeta potentials of 0±5 mV.

Because the first and second solid particles have the same surface property, specifically the same interface property in the ink, a common dispersant suited for adsorption on the first and second solid particles can be used, and the first and second solid particles, when having, for example, the same polarity, can be stably dispersed using a sole kind of dispersant. Further, the first and second solid particles can be dispersed in the ink relatively stably by controlling their zeta potentials within a range of 0±5 mV.

The ink according to the embodiment of the present invention is an inkjet printing ink having a viscosity of 100 mPa·s or less at ordinary temperature.

The invention of the present application is particularly useful, because high awareness is needed for particle dispersibility especially in ink having a low viscosity at ordinary temperature. Specifically, because inkjet printing involves ejection of micro droplets and thus requires low viscosity for the ink itself, sedimentation of the solid particles becomes a concern when the solid particles contained in the ink have a large specific gravity. The ink configured as above can stably disperse the solid particles, and can thus be desirably used as an ink for inkjet printing.

In the ink according to the embodiment of the present invention, the first solid particle is a metal particle, and the second solid particle is a metal oxide particle.

The present invention is particularly useful, because metallic solid particles generally have a large specific gravity and easily settle.

In the ink according to the embodiment of the present invention, the first solid particle is a conductive particle, and the second solid particle is an insulating particle.

The present invention is particularly useful for an ink containing a mixture of solid particles of different properties, because the invention can provide the same interface properties for the solid particles.

In the ink according to the embodiment of the present invention, at least one of the first solid particle and the second solid particle is surface-modified with a material different from the base material.

A property different from the property of the base material can be imparted to each particle by using a material different from the base material in the ink containing a mixture of the first solid particle and the second solid particle.

In the ink according to the embodiment of the present invention, the different material is an organic polymer material.

The different material is carboxymethylcellulose ammonium.

By modifying the surface of each solid particle with an organic polymer material, a molecular chain can be provided for the particle surface, and the solid particle dispersibility can be improved by the steric hindrance created by the molecular chain. Further, because the carboxymethylcellulose ammonium has an insulating property, the zeta potential on the surface of each solid particle can be made close to 0 mV.

The different material is conductive.

By modifying the surface of each solid particle with a conductive material, the conductivity of the ink itself can be improved, and conductive patterns having excellent conductivity can be formed by printing using such an ink.

In the ink according to the embodiment of the present invention, the second solid particle is surface-modified with the same material used as the main component of the base material of the first solid particle.

By modifying one of the solid particles with the same material used as the main component of the base material of the other solid particle, the solid particles can have the same interface properties. Further, the cost can be reduced because the material used for modification does not differ from the base material.

In the ink according to the embodiment of the present invention, at least one of the first solid particle and the second solid particle is surface-modified by a treatment that imparts a charge to the particle surface with a supplied rinse solution.

By the treatment that charges the particle surface with the supplied rinse solution, only the surface charge can have the same polarity, without altering the properties of the solid particles.

The ink according to the embodiment of the present invention further includes a dispersant that has an adsorption group with a zeta potential of the opposite polarity from the polarity of the zeta potentials of the first solid particle and the second solid particle when the first solid particle and the second solid particle have zeta potentials of the same polarity.

When the same polarity is created for the zeta potentials of the solid particles by using the foregoing techniques, improved dispersibility can be expected from the elecrostatic repulsion between the dispersants and from the dispersant steric hinderance in the ink containing the dispersant that has an adsorption group with a zeta potential of the opposite polarity from the first solid particle and the second solid particle.

In the ink according to the embodiment of the present invention, the dispersant is a sole kind of dispersant.

Dispersibility can be improved with a sole kind of dispersant in the ink containing the solid particles of the same surface property. This contributes to reducing cost. It is also possible to simplify the ink composition.

A device according to an embodiment of the present invention is pattern-printed with the foregoing ink.

As described above, the present invention is particularly useful for the printing of device conductive patterns.

As described above, each solid particle can have a homogenous interface (surface) property in the ink in any of the following manner, for example. Modify the surfaces of the first and second solid particles with the same material; modify the surface of the second solid particle using the same material used as the main component of the base material of the first solid particle; and supply a predetermined rinse solution to at least one of the first and second solid particles to charge the particle surface.

When the same polarity is created for the zeta potentials of the first and second solid particles in the ink, the adsorption of the dispersant for the first and second solid particles can be improved in the ink containing the dispersant that has an adsorption group with a zeta potential of the opposite polarity from the first solid particle and the second solid particle. The electric repulsion force acting between the dispersants (between the adsorption groups of the dispersant) can thus effectively act on the first and second solid particles, thereby improving the dispersibility of each solid particle in the ink.

Advantages of the Invention

The present invention can provide an ink that can stably disperse more than one kind of solid particle without complicating the composition more than necessary.

MODES FOR CARRYING OUT THE INVENTION

Figure 1:
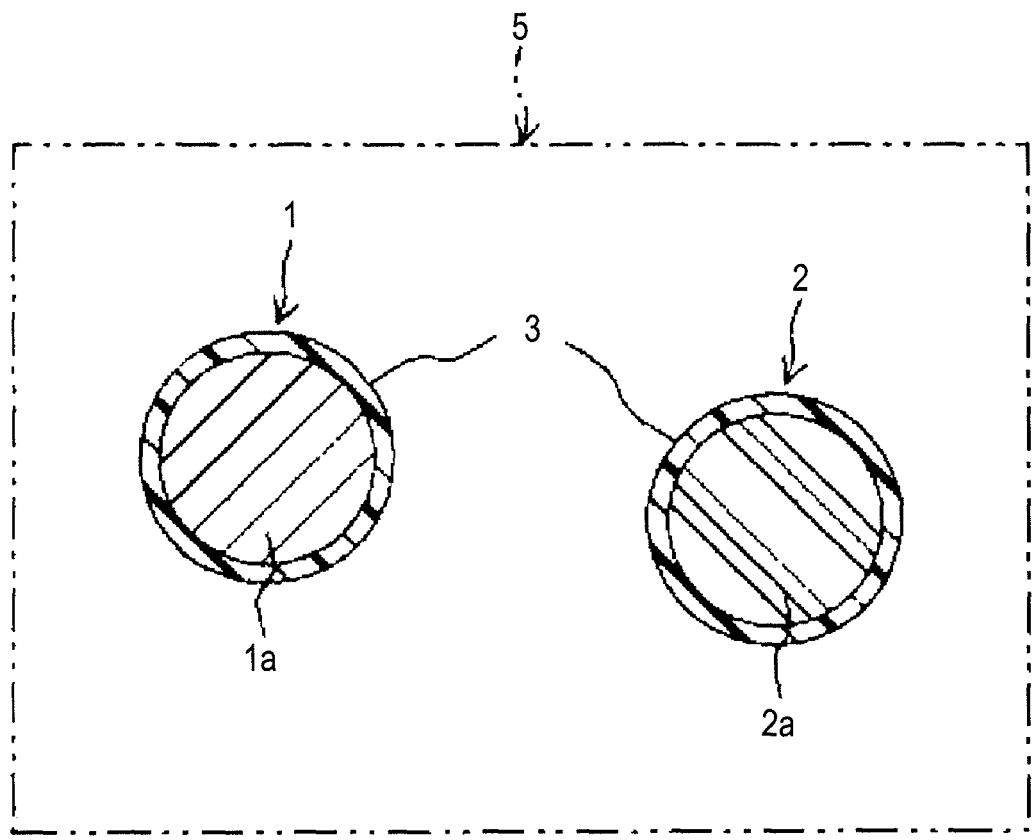
FIG. 1 is a diagram schematically illustrating a structure of solid particles contained in an ink of an embodiment of the invention.

Hereafter, a description will be given of embodiments, while referring to the drawings.

As illustrated in FIG. 1, an ink 5 according to an embodiment of the present invention is an ink for inkjet printing that mainly contains (plural) first solid particles 1, (plural) second solid particles 2 formed of a base material of a different main component from that of the first solid particles 1, a binder, and a sole kind of dispersant. These are contained in a solvent such as butylcarbitolacetate.

The ink 5 for inkjet printing is adapted to have a viscosity of, for example, at most 100 mPa·s or less, preferably 20 mPa·s or less at ordinary temperature (25° C.), so that droplets of ink is desirably ejected through the fine nozzles of an inkjet head. The viscosity of the ink 5 can be adjusted by increasing or decreasing the binder content, or by appropriately varying the types of the binder and the solvent used.

Referring to FIG. 1, the main component (main part of the particle) in the base material of the solid particles 1 in the ink 5 of the present embodiment is a metal particle, for example, a platinum (Pt) particle 1a. On the other hand, the main component in the base material of the solid particles 2 is a metal oxide particle, for example, a zirconia ($ZrO_2$) particle 2a. The surfaces of the solid particles 1 and 2 (the surfaces of the platinum particles 1a and the zirconia particles 2a) are modified with the same material.

Specifically, as illustrated in FIG. 1, the surfaces of the solid particles 1 and 2 have a modification layer 3 by being modified with carboxymethylcellulose ammonium ($NH_4$—CMC), a material different from the main components of the base materials of the solid particles 1 and 2. In this way, the solid particles 1 and 2 have the same surface property in the ink 5. Specifically, the solid particles 1 and 2 have the same (homogenous) interface property in the ink 5.

The solid particles 1 and 2 in the ink 5 therefore have zeta potentials (electrokinetic potentials) of the same polarity, and the potentials themselves can have similar values. This makes it possible to use a common dispersant suited for adsorption on the solid particles 1 and 2. Specifically, for example, the ink 5 may contain a sole kind of dispersant that has adsorption groups of the opposite polarity from the zeta potentials of the solid particles 1 and 2, and the dispersant with the desirable adsorption for the solid particles 1 and 2 can effectively act on the solid particles 1 and 2 with the electric repulsion acting between the dispersants (between the adsorption groups of the dispersant). This improves the dispersibility of the solid particles 1 and 2 in the ink 5. In this manner, the ink 5 can stably disperse the solid particles 1 and 2 without complicating the composition more than necessary.

Figure 2:
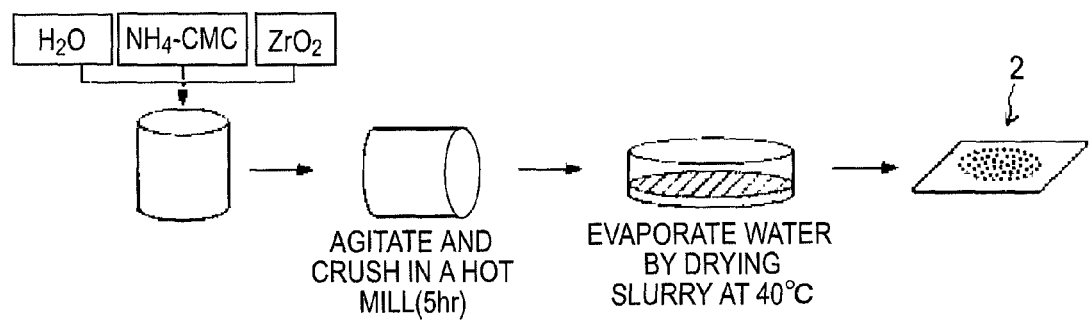
FIG. 2 is a diagram explaining a method for modifying the solid particle surface in the ink of FIG. 1.

The modification layer 3 on the surfaces of the solid particles 1 and 2 may be formed by performing the treatment shown in, for example, FIG. 2. As illustrated in FIG. 2, the zirconia particles 2a of a powdery form representing the main component of the base material of the particles being modified are added to $NH_4$—CMC dissolved in water.

The $NH_4$—CMC solution with the zirconia powder is then placed in a pot mill with balls, and subjected to a mixing and crushing treatment, for example, for 5 hr. The slurry (suspended solid) in the pot mill is then transferred to a container such as a beaker, and dried overnight in a drier heated to, for example, 40° C. to evaporate water from the slurry.

As a result, as illustrated in FIG. 1, the second solid particles 2 can be obtained that have the $NH_4$—CMC modification layer 3 formed on the zirconia particles 2a. The first solid particles 1 can be obtained by performing the modification treatment for a platinum powder (platinum particles 1a).

Figure 3:
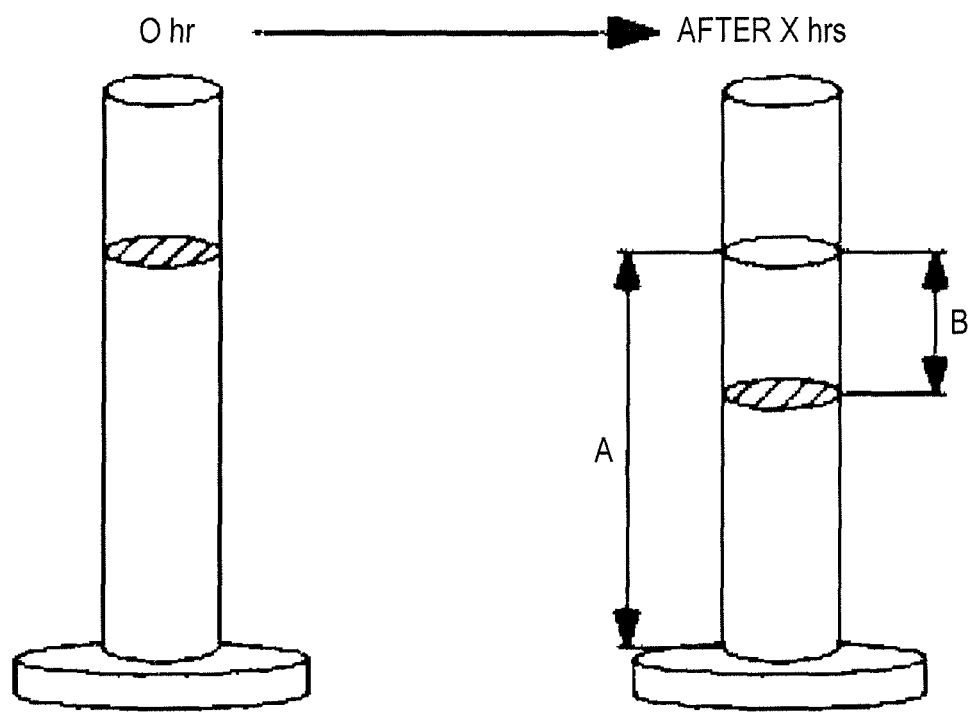
FIG. 3 is a diagram explaining the method used in a sedimentation test to evaluate the dispersibility of the solid particles in the ink of FIG. 1.

The dispersibility of the solid particles 1 and 2 in the ink 5 can be evaluated by a sedimentation test, as represented in FIG. 3. Specifically, as illustrated in FIG. 3, an ink of interest is charged into a graduated cylinder equipped with a plug, and a time measurement from the initial hour (0 hr) is started. Over time, the solid components (components of the suspension liquid) settle and the supernatant clears. At x hours (x hr), the height from the bottom of the ink to the uppermost surface above the supernatant in the graduated cylinder is measured to determine the total ink amount A. As this time, the height from the top surface of the sediment solid components (bottom of the supernatant) to the top surface of the supernatant is also measured to determine supernatant amount B.

The proportion of the supernatant amount B in the total ink amount A after x hours (B/A) can then be found to quantitatively determine the dispersibility of the solid components (solid particles 1 and 2) in the ink. Specifically, the proportion of the supernatant amount B increases when the solid particles 1 and 2 have low dispersibility in the ink, and decreases when the dispersibility of the solid particles 1 and 2 is high. Note that the sedimentation test is also applicable to the dispersibility evaluation of the solid particles in the inks 6, 7, and 8 described below with reference to FIGS. 4 to 7.

In the example of FIG. 1, the solid particles 1 and 2 (platinum particles 1a, zirconia particles 2a) are modified with the organic polymer material $NH_4$—CMC. However, the material used for modification may be appropriately selected. For example, aside from $NH_4$—CMC, other organic polymer materials may be used as the modification material, provided that the material remains as a solid upon being dried. Further, for example, conductive materials may be used, instead of the $NH_4$—CMC having an electrical insulation property. For example, when conductive material is used to modify the platinum particles 1a and the zirconia particles 2a, the conductive material imparts conductivity also to the non-conductive zirconia particles 2a. An ink containing large numbers of such conductive particles can be used for inkjet printing to form conductive patterns having excellent electrical conductivity.

Using the same material for the modification of each type of solid particle enables a sole kind of dispersant to be used for the ink. In other words, by freely selecting the material used for the modification of the particle surface, any dispersant can be selected for adsorption to the surface of each type solid particle. Further, using a sole kind of dispersant can simplify the ink composition, and can thus reduce cost.

In FIG. 1 and FIGS. 4 to 7 (described later), the platinum particles 1a and the zirconia particles 2a are presented as examples of the main components of the base materials of the solid particles. However, the main component particles of the base materials to be modified (by the rinse treatment of FIGS. 6 and 7) may be appropriately selected. For example, metal particles such as iridium (Ir) particles and palladium (Pd) particles may be selected instead of the platinum particles. Similarly, instead of the zirconia particles 2a, metal oxide particles, for example, such as aluminum oxide ($Al_2O_3$) particles may be selected.

The material of the main component particles of the base materials is preferably selected taking into account the material of the target substrate (base) used for forming print patterns. When the target substrate (base) is, for example, a ceramic substrate that contains materials such as aluminum oxide (alumina), aluminum oxide particles may be selected as the main component particles of the base materials to provide similar properties, such as thermal expansion coefficient, for the target substrate and the print patterns. This makes it possible to suppress, for example, the mechanical stress that may be exerted on the substrate under the influence of, for example, temperature changes. Likewise, when the target substrate is a ceramic substrate that contains zirconia particles, for example, solid particles containing zirconia particles as the main component of the base material may be contained in the ink.

Figure 4:
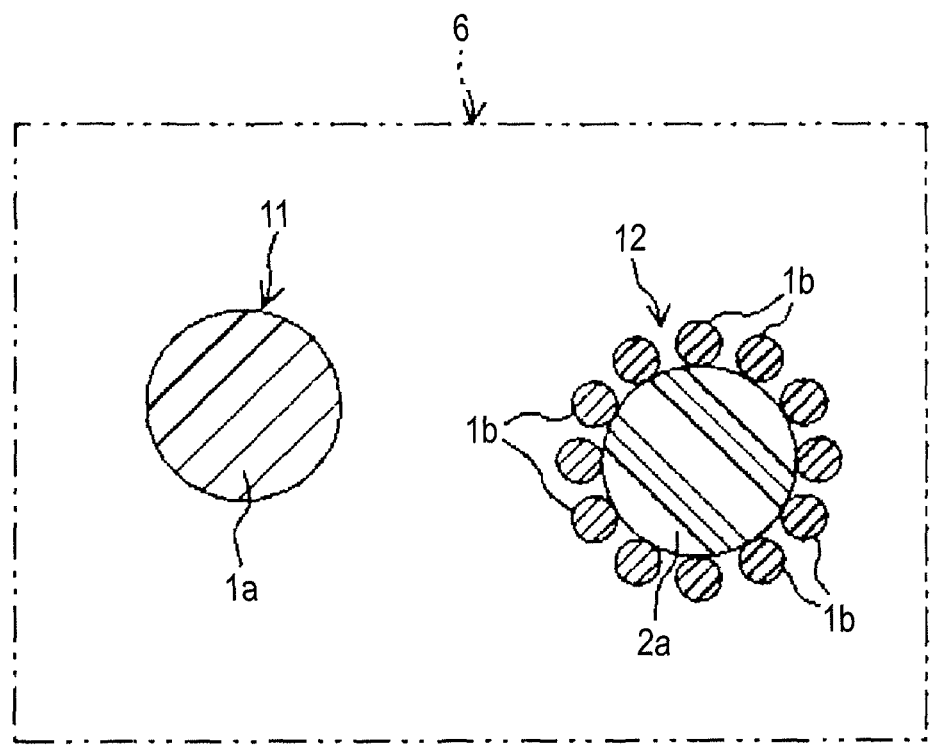
FIG. 4 is a diagram schematically illustrating a structure of solid particles contained in an ink according to another embodiment different from the ink of FIG. 1.

FIG. 4 illustrates an ink 6 for inkjet printing according to another embodiment. As illustrated in FIG. 4, the ink 6 mainly contains first solid particles 11 of entirely the platinum particles 1a, second solid particles 12 having a modification layer 1b formed on the surfaces of the zirconia particles 2a, a sole kind of dispersant effective for platinum, and a binder. The surfaces of the second solid particles 12 are partially modified with the same platinum used as the material of the first solid particles 11 (main component of the base material).

The modification layer 1b is formed by using, for example, an impregnation method. Specifically, a carrier zirconia powder is charged into a platinic acid aqueous solution (catalyst metal salt in water), and, after being dried by evaporating water, the powder is subjected to a heat treatment at about 500° C. to deposit (support) the catalyst metal platinum 1b on the surfaces of the carrier zirconia particles 2a.

The particle surface properties are thus homogenous for the second solid particles 12 surface-modified with platinum, and for the first solid particles 11 of entirely the platinum particles 1a. The interface properties in the ink are therefore also homogenous (for example, the values and the polarity of the zeta potentials are the same). In this way, the sole kind of dispersant effective for platinum becomes effective in the ink 6 that contains more than one kind of solid particle (including metal oxide particles such as zirconia particles). The ink 6 thus can stably disperse the solid particles 11 and 12 with a relative simple composition.

Figure 5:
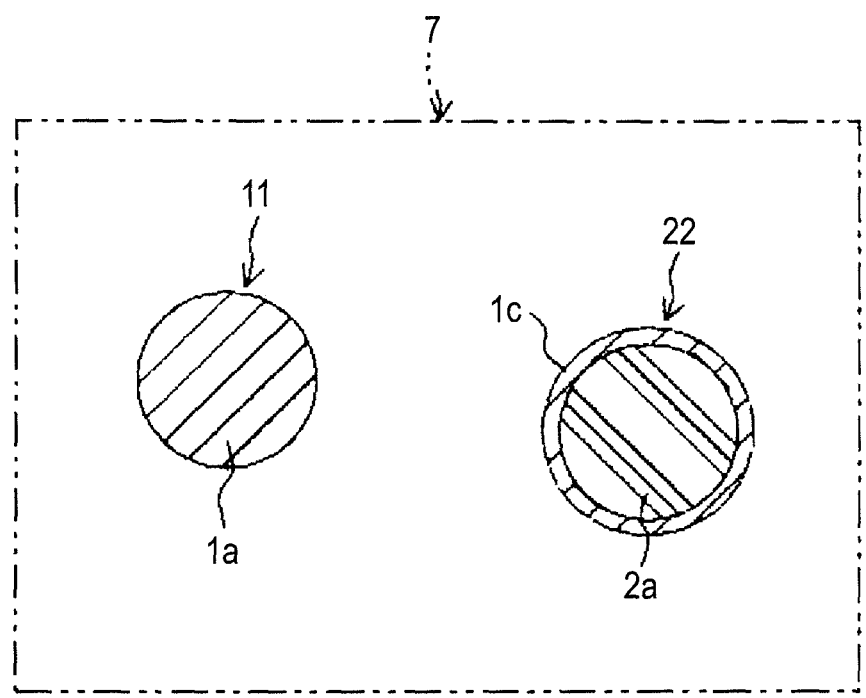
FIG. 5 is a diagram schematically illustrating a structure of solid particles contained in an ink according to another embodiment different from the inks of FIGS. 1 and 4.

FIG. 5 represents yet another embodiment. As illustrated in FIG. 5, an ink 7 for inkjet printing according to this embodiment mainly contains first solid particles 11 of entirely the platinum particles 1a, second solid particles 22 having a modification layer 1c formed on the surfaces of the zirconia particles 2a, a sole kind of dispersant effective for platinum, and a binder. The whole surfaces of the second solid particles 22 are modified with the same platinum used as the material of the first solid particles 11 (main component of the base material).

The modification layer 1c is formed by, for example, the platinum plating of the zirconia particles carrying the platinum deposited on the particle surface. The modification layer 1c is formed on the whole surfaces of the second solid particles 22 by plating platinum on the zirconia particles carrying the platinum deposited on the surface. In this way, as with the ink 6 shown in FIG. 4, the sole kind of dispersant effective for platinum becomes effective in the ink 7 that contains more than one kind of solid particle. The ink 7 of the present embodiment can thus effectively disperse the solid particles 11 and 22 without complicating the composition more than necessary.

In the inks 6 and 7 shown in FIGS. 4 and 5, the surfaces of the metal oxide particles, namely, the zirconia particles 2a are modified with a metal material. However, instead of modifying the surfaces of the zirconia particles 2a, the surfaces of the metal particles 1a may be modified with metal oxide material to provide homogenous solid particle surfaces. Further, the modification method may be appropriately selected according to the material used to modify the particle surface.

In the examples of FIGS. 4 and 5, an impregnation method or a plating method is used to modify the particle surface with a metal material (platinum). However, vapor deposition such as PVD and CVD, or sputtering may be used for modification with metal material. For the particle surface modification with metal oxide material, methods such as sputtering, vapor deposition, and an impregnation method may be used.

For modification, the whole surface of the solid particle may be coated, or the coating may be supported only in part of the solid particle surface. Specifically, the solid particle surface may be modified in any ways, as long as homogenous surface properties are obtained.

Figure 6:
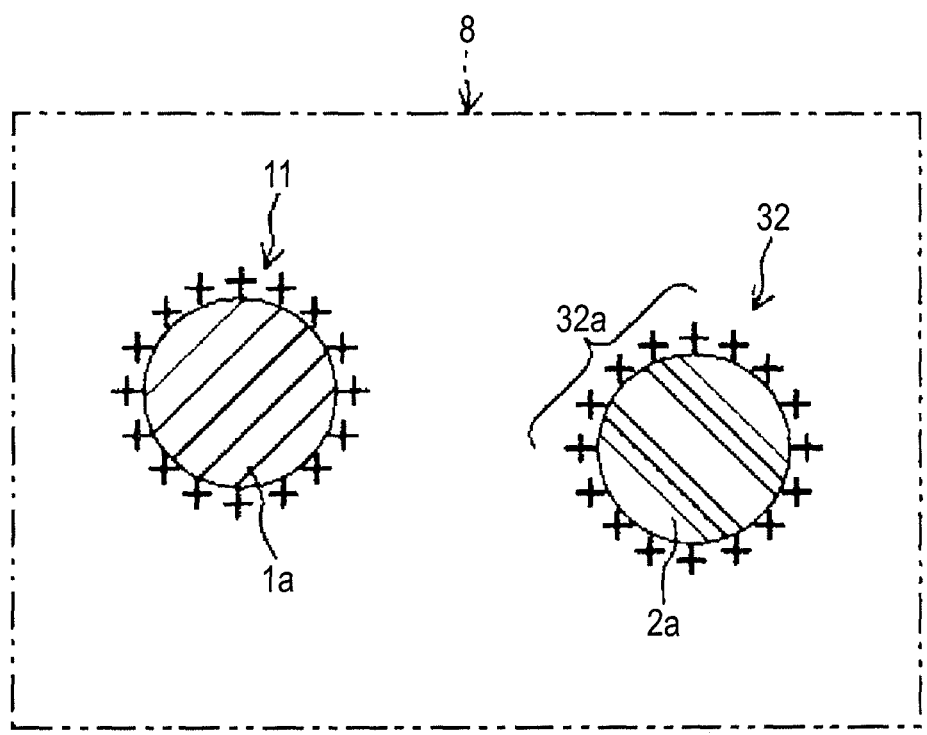
FIG. 6 is a diagram schematically illustrating a structure of solid particles contained in an ink according to yet another embodiment different from the inks of FIG. 1 and FIGS. 4 and 5.
Figure 7:
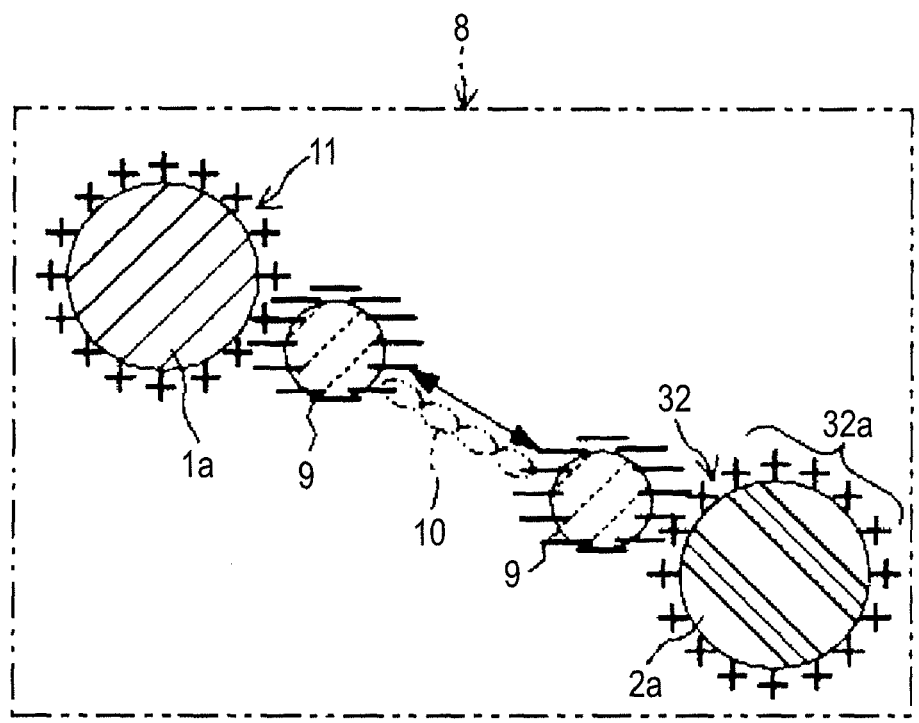
FIG. 7 is a diagram schematically representing the effect of a dispersant contained in the ink of FIG. 6.

FIGS. 6 and 7 represent an ink 8 for inkjet printing according to still another embodiment. As illustrated in FIGS. 6 and 7, the ink 8 of this embodiment mainly contains first solid particles 11 of entirely platinum particles 1a, second solid particles 32 obtained by treating the zirconia particles 2a with a rinse solution, a sole kind of dispersant (made up of a plurality of particles) 9, and a binder. Here, the second solid particles 32 have a surface charge 32a created by a treatment with a rinse solution supplied to the particle surface prior to containing the second solid particles 32 in the ink.

Specifically, as illustrated in FIGS. 6 and 7, the surfaces of the second solid particles 32 are charged with a rinse solution selected in such a way as to make the polarity of the zeta potential of the second solid particles 32 positive, for example, when the zeta potential of the first solid particles 11 is positive (the same polarity) in the ink 8. Examples of the rinse solution include acidic solutions such as hydrochloric acid, and basic solutions such as sodium hydroxide.

Referring to FIG. 7, the adsorption of the dispersant 9 for the first and second solid particles can be improved when the dispersant 9 contained in the ink has adsorption groups with a zeta potential of the opposite polarity (for example, negative polarity) from the same polarity (for example, positive polarity) of the zeta potentials of the solid particles 11 and 32 in the ink 8. As in the inks 5, 6, and 7 illustrated in FIGS. 1, 4, and 5, the dispersibility of the solid particles in the ink 8 illustrated in FIG. 7 also can be improved by the electric repulsion of the dispersants having improved adsorption for the solid particles, and by the steric hindrance 10 between the particles due to the compatible groups (not shown) of the dispersant securely adhering to the solid particles. Note that the dispersant 9 has adsorption groups and compatible groups, and the adsorption groups adsorb to the solid particle surfaces.

The inks 5, 6, 7, and 8 shown in FIG. 1 and FIGS. 4 to 7 are for inkjet printing that requires the ink to be ejected in micro droplets through nozzles. For this reason, these inks are provided as low-viscosity inks having a viscosity of, for example, 20 mPa·s or less at ordinary temperature. However, despite the low viscosity, the inks can be suitably used for inkjet printing without fears concerning, for example, sedimentation of solid particles of a large specific gravity, because the solid particles are stably dispersed as above.

Figure 8:
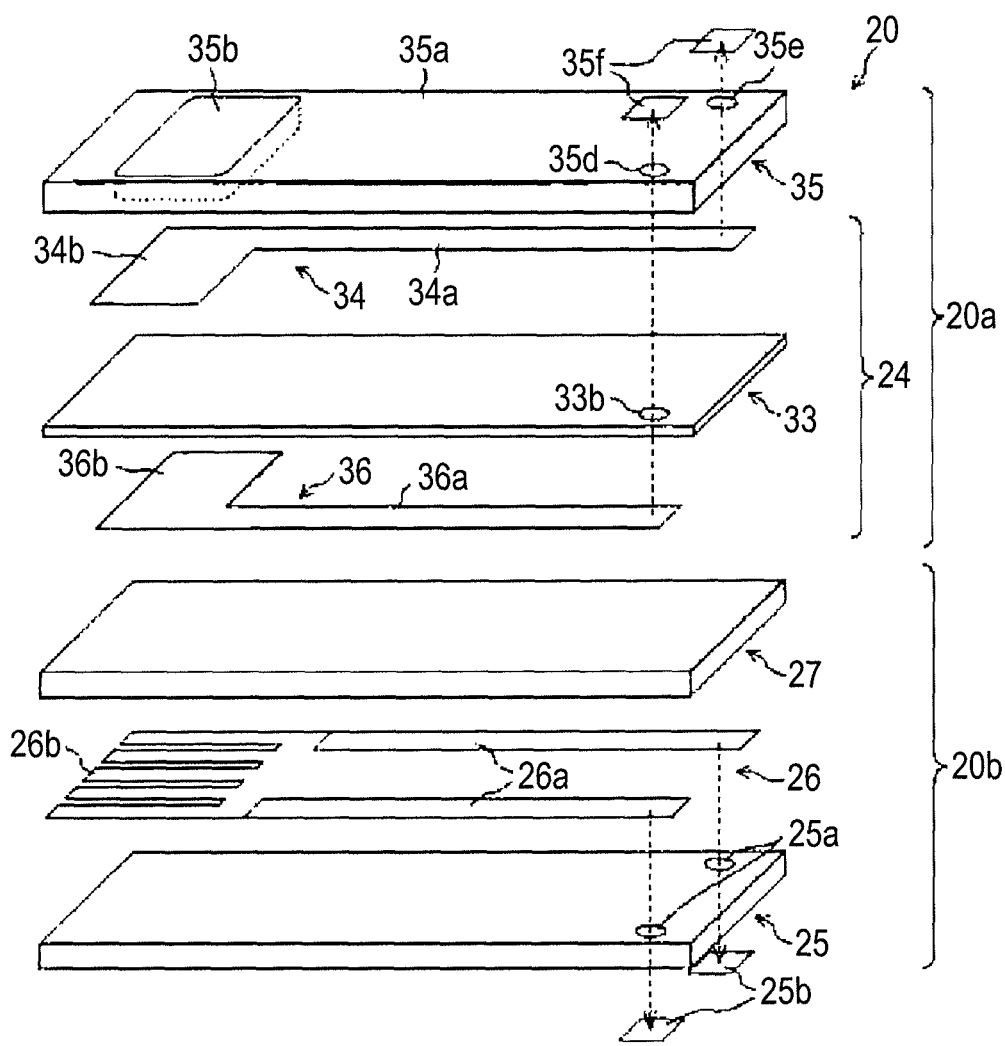
FIG. 8 is an exploded perspective view of a sensing element provided with a substrate having conductive patterns printed with the ink of the embodiment of the invention.

Referring to FIG. 8, the following describes a sensing element provided with a substrate having conductive patterns formed by inkjet printing using any of the inks 5, 6, 7, and 8 shown in FIG. 1 and FIGS. 4 to 7. The sensing element will be described as an example of a device to which the ink of the present invention is applied for conductive pattern printing. As illustrated in FIG. 8, the sensing element 20 is a gas sensing element configured as a laminate at least of a gas sensing element main body 20a and a heater 20b.

The heater 20b includes a first substrate 27, a second substrate 25, and a resistance heating element 26. The resistance heating element 26 is formed of primarily platinum or the like, whereas the first substrate 27 and the second substrate 25 are formed of ceramic sintered bodies of primarily, for example, aluminum oxide (alumina). The resistance heating element 26 is sandwiched between the first substrate 27 and the second substrate 25 each having a rectangular shape.

The resistance heating element 26 includes a heating unit 26b of a sinuous shape that produces heat under applied electricity, and a pair of heater lead units 26a each connected at one end to the heating unit 26b and extending along the longitudinal direction of the first substrate 27 and the second substrate 25. At the other end, the heating lead units 26a are connected via two through holes 25a of the second substrate 25 to a pair of heater energizing terminals 25b connected to external terminals provided for interconnection with an external circuit.

The gas sensing element main body 20a includes an oxygen concentration detecting cell (oxygen concentration detecting cell substrate) 24 and a protective layer 35. The oxygen concentration detecting cell 24 has a rectangular solid electrolyte substrate 33, and a first electrode pattern 36 and a second electrode pattern 34 provided as conductive patterns. The solid electrolyte substrate 33 is a solid electrolyte for oxygen concentration cells configured from, for example, a zirconia ($ZrO_2$) sintered body or the like that contains yttria ($Y_2O_3$) or calcia (CaO) added as a stabilizer. Note that the solid electrolyte substrate (solid electrolyte) 33 may also be configured from a $LaGaO_3$ sintered body or the like.

The first electrode pattern 36 and the second electrode pattern 34 are printed by inkjet printing on the principal surfaces on the both sides of the solid electrolyte substrate 33 before sintering (firing), using the inks shown in FIG. 1 and FIGS. 4 to 7. After printing the patterns, at least the first electrode pattern 36, the second electrode pattern 34, and the solid electrolyte substrate 33 of the sensing element 20 are simultaneously fired at high temperatures in excess of, for example, 1,100° C.

Here, despite the heating of the first electrode pattern 36 and the second electrode patter 34 at high temperatures above 1,100° C., the excess sintering can be suppressed, and thus any decrease in the conductive performance of the patterns themselves, and disconnection can be suppressed, because the material used for the pattern printing is the ink that stably disperses more than one kind of solid particle, as described above. When the patterns are printed with the ink 5 that contains the first and second solid particles 1 and 2 modified with the modification layer 3 of $NH_4$—CMC shown in FIG. 1, the $NH_4$—CMC modification layer 3 burns out with the dispersant 9 during the high-temperature sintering process in excess of 1,100° C. As a result, the platinum particles 1a as the main component of the base material of the first solid particles 1 are exposed on the surfaces and form the conductive patterns.

The first electrode pattern 36 and the second electrode pattern 34 include a first electrode portion 36b and a second electrode portion 34b, respectively, provided opposite to each other on the both sides of the solid electrolyte substrate 33 to form a detecting portion (not illustrated) in cooperation with the solid electrolyte substrate 33.

The first electrode pattern 36 has a first electrode lead portion 36a that extends from the first electrode portion 36b along the longitudinal direction of the solid electrolyte substrate 33. The second electrode pattern 34 has a second electrode lead portion 34a that extends from the second electrode portion 34b along the longitudinal direction of the solid electrolyte substrate 33. Note that the protective layer 35 is laminated on the solid electrolyte substrate 33 with the second electrode pattern 34 in between, and includes a porous electrode protective layer 35b provided to protect the second electrode portion 34b from poisoning, and a reinforced protective layer 35a provided to protect the solid electrolyte substrate 33.

An end of the first electrode lead portion 36a is connected to one of signal extracting terminals 35f via a through hole 33b of the solid electrolyte substrate 33 and a through hole 35d of the protective layer 35. An end of the second electrode lead portion 34a is connected to the other signal extracting terminal 35f via a through hole 35e of the protective layer 35. The sensing element 20 configured as above can be adapted to measure oxygen concentration by utilizing the concentration cell effect of the oxygen concentration detecting cell 24, and is usable as, for example, an air-fuel sensor.

As described above, the sensing element 20 illustrated in FIG. 8 has conductive patterns formed on the ceramic substrate by using an inkjet printing ink having improved dispersibility for more than one kind of solid particle illustrated in FIG. 1 and FIGS. 4 to 7, and can thus improve the reliability of electrical interconnections in the element.

When the first electrode pattern 36 and the second electrode pattern 34 are printed with the inks 6 and 7 shown in FIGS. 4 and 5, the non-conductive zirconia particles 2a are also modified with platinum and become conductive. This further improves the electrical conductivity of the printed conductive patterns.

Further, in the sensing element 20, the printed patterns (the first electrode pattern 36 and the second electrode pattern 34) are formed on the solid electrolyte (solid electrolyte substrate 33) formed of a zirconia sintered body, using the inks 5, 6, 7, and 8 containing the solid particles that use the zirconia particles 2a as the main component of the base material. In this way, the printed patterns and the print target solid electrolyte can have similar thermal expansion coefficients. This makes it possible to suppress, for example, the mechanical stress that may be exerted on the printed patterns and the solid electrolyte (the oxygen concentration detecting cell 24 shown in FIG. 8) during the high-temperature firing process. In this way, defects, such as bowing after the firing, can be suppressed.

While the specific embodiments have been described, the present invention is not just limited to these embodiments, and various modifications are possible without departing from the gist of the invention. For example, the present invention is applicable not only to the inks 5, 6, 7, and 8 described as containing the first and second solid particles in FIG. 1 and FIGS. 4 to 7, but also to inks that contain three or more kinds of solid particles. Specifically, each solid particle can have a homogenous surface in any of the following manner. Modify the surfaces of the all solid particles with the same material; modify the surfaces of the rest of the solid particles with the same material used as the main component of the base material of the first solid particles; and supply a rinse solution to at least one of the different kinds of solid particles.

When the first and second (or even more) solid particles are to have zeta potentials of 0±5 mV, the surface of each solid particle may be modified with a specific material of a known zeta potential in the ink, by selecting such a specific material from, for example, the result of zeta potential measurement in a preliminary experiment. The reason for providing a zeta potential of 0±5 mV for each solid particle is to minimize the charge unbalance between the solid particles, taking into account such factors as measurement variation (the target zeta potential value is 0 mV). With the zeta potential of the solid particle in the ink close to 0 mV, adsorption due to the charges between the solid particles can be suppressed, and the dispersant present on the solid particle surfaces can hinder between the solid particles (steric hinderance). As a result, more than one kind of solid particle can be stably dispersed in the ink.

In FIG. 8, the print patterns are formed on the cell substrate installed in the sensing element. However, the ink of the present invention is also applicable to, for example, the pattern printing of semiconductor-related components. Note that the term "device" as used in the claims encompasses not only the gas sensor exemplified in FIG. 8, but a semiconductor substrate or the like.

DESCRIPTION OF REFERENCE NUMERALS AND SIGNS 1, 11 First solid particle
1a Platinum particle
2, 12, 22, 32 Second solid particle
2a Zirconia particle
3, 1b, 1c Modification layer
5, 6, 7, 8 Ink
9 Dispersant

The invention claimed is:

1. An ink comprising:
a first solid particle; and
a second solid particle formed of a base material of a different main component from that of the first solid particle,
at least one of the first solid particle and the second solid particle being surface-modified, and
the first solid particle and the second solid particle having zeta potentials of the same polarity, or zeta potentials of 0±5 mV.

2. The ink as claimed in claim 1, wherein the ink is an inkjet printing ink having a viscosity of 100 mPa·s or less at ordinary temperature.

3. The ink as claimed in claim 1, wherein the first solid particle is a metal particle, and wherein the second solid particle is a metal oxide particle.

4. The ink as claimed in claim 1, wherein the first solid particle is a conductive particle, and wherein the second solid particle is an insulating particle.

5. The ink as claimed in claim 1, wherein the second solid particle is surface-modified with the same material used as the main component of the base material of the first solid particle.

6. The ink as claimed in claim 1, wherein at least one of the first solid particle and the second solid particle is surface-modified by a treatment that imparts a charge to the particle surface with a supplied rinse solution.

7. The ink as claimed in claim 1, further comprising a dispersant that has an adsorption group with a zeta potential of the opposite polarity from the polarity of the zeta potentials of the first solid particle and the second solid particle when the first solid particle and the second solid particle have zeta potentials of the same polarity.

8. The ink as claimed in claim 7, wherein the dispersant is a sole kind of dispersant.

9. The ink as claimed in claim 1, wherein at least one of the first solid particle and the second solid particle is surface-modified with a material different from the base material.

10. The ink as claimed in claim 9, wherein the different material is an organic polymer material.

11. The ink as claimed in claim 10, wherein the different material is carboxymethylcellulose ammonium.

12. The ink as claimed in claim 10, wherein the different material is conductive.

13. A device pattern-printed with the ink as claimed in claim 1.

* * * * *